(12) United States Patent
Jenensch et al.

(10) Patent No.: US 12,455,547 B2
(45) Date of Patent: Oct. 28, 2025

(54) MANAGING A POSTPROCESSOR FOR MACHINING WITH A MACHINE TOOL METHOD, COMPUTER SYSTEM, AND MACHINE TOOL

(71) Applicant: Siemens Industry Software Inc., Plano, TX (US)

(72) Inventors: Thomas Jenensch, Chorin (DE); Sophie Oudot, Paris (FR)

(73) Assignee: Siemens Industry Software Inc., Plano, TX (US)

( * ) Notice: Subject to any disclaimer, the term of this patent is extended or adjusted under 35 U.S.C. 154(b) by 407 days.

(21) Appl. No.: 18/124,561

(22) Filed: Mar. 21, 2023

(65) Prior Publication Data

US 2023/0305512 A1 Sep. 28, 2023

Related U.S. Application Data

(63) Continuation of application No. PCT/IB2022/052591, filed on Mar. 22, 2022.

(51) Int. Cl.
*G05B 19/29* (2006.01)
*G05B 19/4093* (2006.01)

(52) U.S. Cl.
CPC ....... *G05B 19/29* (2013.01); *G05B 19/40938* (2013.01); *G05B 2219/37618* (2013.01)

(58) Field of Classification Search
None
See application file for complete search history.

(56) References Cited

U.S. PATENT DOCUMENTS

2023/0315051 A1* 10/2023 Irie .................. G05B 19/409
700/86

* cited by examiner

*Primary Examiner* — Ryan A Jarrett
(74) *Attorney, Agent, or Firm* — Lempia Summerfield Katz LLC

(57) ABSTRACT

For an improved management of a postprocessor, for machining with a machine tool, a computer-implemented method includes providing toolpath data for machining a workpiece with a tool along a corresponding toolpath. The tool is comprised by a machine tool that is numerically controlled by a control device. Sample machine code is provided. A trial postprocessor software component for determining machine code using toolpath data is provided. Trial machine code is determined using the trial postprocessor software component and the toolpath data. A sample code architecture of the sample machine code and a trial code architecture of the trial machine code are determined. Characteristics of the sample machine code are determined by comparing the sample code architecture with the trial code architecture, and a new postprocessor software component is determined by incorporating the characteristics into the trial postprocessor software component.

18 Claims, 6 Drawing Sheets

MANAGING A POSTPROCESSOR FOR MACHINING WITH A MACHINE TOOL METHOD, COMPUTER SYSTEM, AND MACHINE TOOL

This application is a continuation application of International Application No. PCT/IB2022/052591, filed Mar. 22, 2022. The entire contents of this document are hereby incorporated herein by reference.

TECHNICAL FIELD

The present disclosure is directed, in general, to machining where materials (e.g., extremely hard materials) are to be machined (e.g., by cutting, boring, grinding, shearing, or other forms of deformation including additive manufacturing). For such purposes, machine tools are used, whereby such machine tools are generally controlled numerically by a control device or processor. Software solutions for computer-aided design/manufacturing/engineering (CAD/CAM/CAE) may be used to support or control the machining process, and postprocessors may be used as a kind of driver software of the machine tools (collectively referred to herein as product systems).

BACKGROUND

Machine tools, such as lathes, milling machines, etc., are widely used to machine workpieces. Generally, such machine tools include a tool for machining the workpiece and are numerically controlled by a control device. Machining a workpiece regularly involves comprehensive and time-consuming preparatory steps to provide a good quality of the machined workpiece, to avoid an excessive tool wear, and to provide efficiency with respect to time and costs. For example, a toolpath for machining a workpiece with a tool along a toolpath may need to be translated by a postprocessor into machine code that is interpretable and executable by the machine tool.

Currently, product systems and solutions that support managing a postprocessor exist. Such product systems may benefit from improvements.

SUMMARY AND DESCRIPTION

The scope of the present invention is defined solely by the appended claims and is not affected to any degree by the statements within this summary.

Variously disclosed embodiments include managing postprocessor methods, computer systems, and machine tools that may be used to facilitate managing a postprocessor (e.g., determining a new postprocessor).

According to a first aspect of the present embodiments, a computer-implemented method is provided. The computer-implemented method may include: providing toolpath data for machining a workpiece with a tool along a corresponding toolpath, where the tool is comprised by a machine tool that is numerically controlled by a control device; providing sample machine code; providing a trial postprocessor software component for determining machine code using toolpath data; determining trial machine code using the trial postprocessor software component and the toolpath data; determining a sample code architecture of the sample machine code and a trial code architecture of the trial machine code; determining characteristics of the sample machine code by comparing the sample code architecture with the trial code architecture; and determining a new postprocessor software component by incorporating the characteristics into the trial postprocessor software component.

According to a second aspect of the present embodiments, a computer system may be arranged and configured to carry out the acts of this computer-implemented method of managing a postprocessor (e.g., of determining a new postprocessor). By way of example, the computer system may be a computer-aided manufacturing system or a control device for numerically controlling a machine tool that includes a tool for machining a workpiece along a toolpath.

According to a third aspect of the present embodiments, a machine tool may include a tool for machining a workpiece along a toolpath, and this control device for numerically controlling the machine tool.

According to a fourth aspect of the present embodiments, a computer program product may include computer program code that, when executed by a computer system, causes the computer system to carry out the acts of this computer-implemented method of managing a postprocessor (e.g., of determining a new postprocessor).

According to a fifth aspect of the present embodiments, a computer-readable medium may include computer program code that, when executed by a computer system, causes the computer system to carry out the acts of this computer-implemented method of managing a postprocessor (e.g., of determining a new postprocessor). By way of example, the described computer-readable medium may be non-transitory and may further be a software component on a storage device.

DETAILED DESCRIPTION

Figure 1:
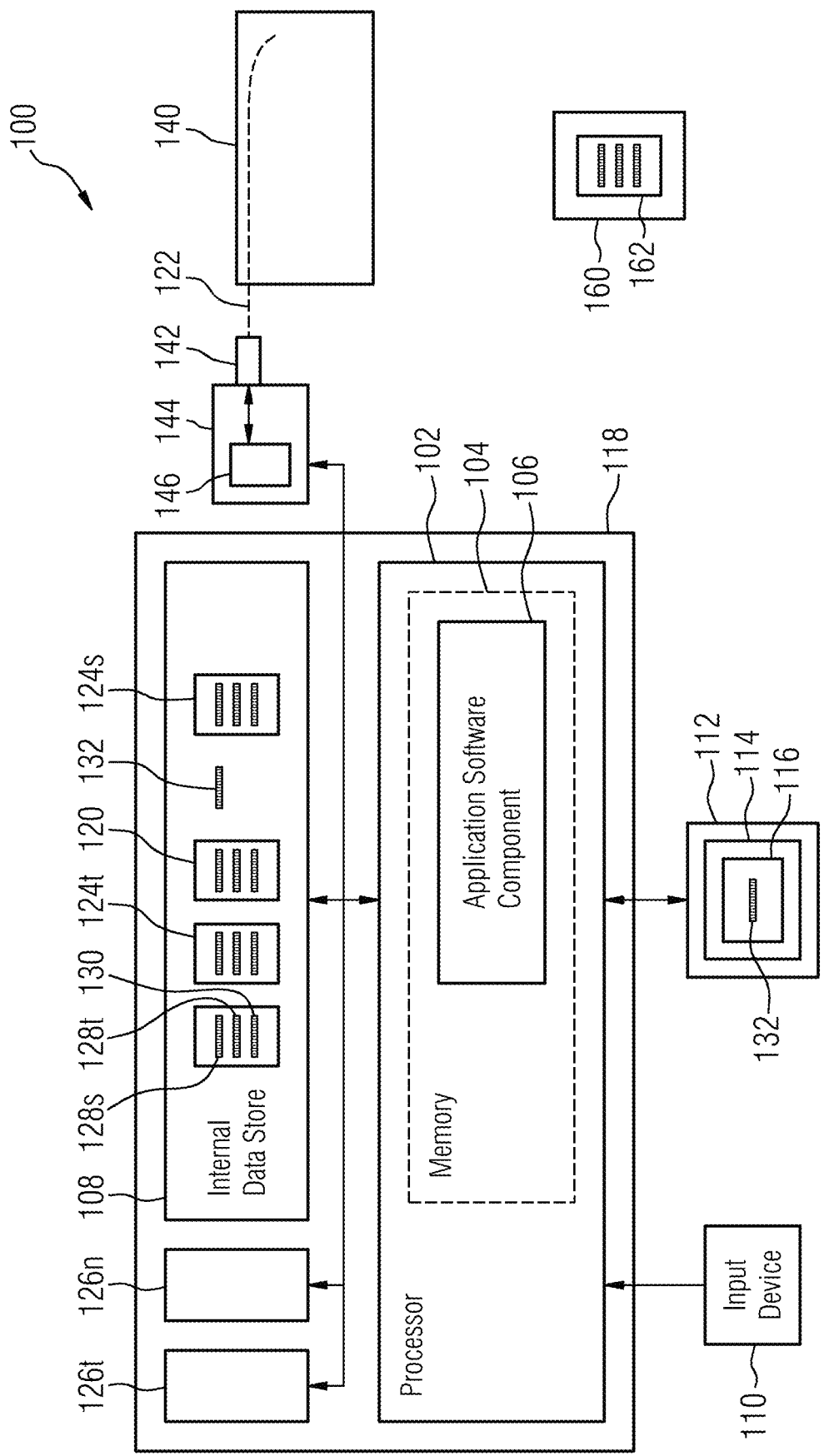
FIGS. 1-3 illustrate a functional block diagram of an example product system that facilitates managing a postprocessor for machining with a machine tool.

Various technologies that pertain to systems and methods for managing a postprocessor (e.g., determining a new postprocessor) in a product system will now be described with reference to the drawings, where like reference numerals represent like elements throughout. Those skilled in the art will understand that the principles of the present disclosure may be implemented in any suitably arranged apparatus. It is to be understood that functionality that is described as being carried out by certain system elements may be performed by multiple elements. Similarly, for example, an element may be configured to perform functionality that is described as being carried out by multiple elements. Terms "postprocessor" and "postprocessor software component" are used in the present patent document equivalently.

With reference to FIG. 1, a functional block diagram of an example product system or data processing system 100 that facilitates managing a postprocessor 126 (e.g., determining a new postprocessor 126*n*) for machining with a machine tool 144 is illustrated. The processing system 100 may include a computer-aided manufacturing (CAM) system 118 or another software system, such as a design-aided design (CAD) system, a computer-aided engineering (CAE) system, a product lifecycle management (PLM) system, or a manufacturing operations management (MOM) system. The processing system 100 may include at least one processor 102 that is configured to execute at least one application software component 106 from a memory 104 accessed by the processor 102. The application software component 106 may be configured (e.g., programmed) to cause the processor 102 to carry out various acts and functions described herein. For example, the described application software component 106 may include and/or correspond to one or more components of a computer-aided manufacturing software application and/or a machine tool control software application that is configured to generate and store product data in a data store 108 such as a database.

To enable the enhanced management of a postprocessor 126 (e.g., the enhanced determination of a new postprocessor 126n) for machining with a machine tool 144, the described product system or data processing system 100 may include at least one input device 110 and at least one display device 112 (e.g., a display screen). The described processor 102 may be configured to generate a GUI 114 through the display device 112. Such a GUI 114 may include GUI elements such as buttons, links, search boxes, lists, text boxes, images, scroll bars usable by a user to provide inputs through the input device 110 that cause managing a postprocessor 126 (e.g., determining a new postprocessor 126n) for machining with a machine tool 144 and/or cause machining of a workpiece 140. The input device 110 and/or the display device 112 may be comprised by the CAM system 118 or be comprised by the machine tool 144

For the facilitated management of a postprocessor 126 (e.g., the enhanced determination of a new postprocessor 126n) for machining with a machine tool 144, the machine tool 144 may include a tool 142 for machining the workpiece 140 along a toolpath 122. The tool 142 may be numerically controlled by the processor 102, the machine tool 144, or, for example, the control device 144. Herein, machining may include, among others, processes during which a material (e.g., a metal) is cut into a desired final shape and size by a controlled material-removal process. The processes that have this common theme (e.g., controlled material removal) are today collectively known as subtractive manufacturing and may include milling or turning. In the context of the present patent document, machining may further include additive manufacturing processes (e.g., processes of controlled material addition). The tool 142 may then add material (e.g., layers of material) to the workpiece 140.

In an example embodiment, the application software component 106 and/or the processor 102 may be configured to provide toolpath data 120 for machining a workpiece 140 with a tool 142 along a corresponding toolpath 122, where the tool 142 is comprised by a machine tool 144 that is numerically controlled by a control device 146. The toolpath data 120 corresponding to the toolpath 122 may be provided (e.g., by a user using the GUI 114, the input device 110, the display device 112, or the like). Alternatively or additionally, the toolpath data 120 may be provided by the CAM system 118 (or other software, such as CAD, CAE, PLM, or MOM software). Herein, the toolpath data 120 may be provided to the processor 102 and/or to the data store 108 where the toolpath data 120 may be stored.

By way of example, the tool 142 may be moved or positioned by the control device 146, where the tool 142 may in some examples include a cutter for subtractive manufacturing or a printer head or light-emitting device for additive manufacturing. In some examples, a toolpath data 120 may include a geometric toolpath 122, such as circles and lines, along which the tool 142 is moved. The toolpath data 120 may further include non-geometric information, such as events that may describe technological properties, such as a speed specification or a linear movement in x, y, or z direction of the tool 142, which are necessary to produce the geometric basic elements.

In some examples, the toolpath 122 may define a turning process (e.g., a rotating workpiece 140 and a tool 142 moved relatively to the rotating workpiece 140) or a milling process (e.g., a fixed workpiece 140 and a rotating tool 142 moved relatively to the fixed workpiece 140). The toolpath data 120 may, for example, include geometry information on a trajectory along which the tool 142 may be moved. In some examples, the toolpath data 120 may further include data on axis information, tool wear, tool dimensions, a used coolant, spindle, tool changer, coordinate system changes, head, or any combination thereof.

In some examples, the application software component 106 and/or the processor 102 may further be configured to determine the toolpath data 120 based on a provided available toolpath 122 or based on a provided three-dimensional start shape of the workpiece 140 and a provided three-dimensional target shape of the workpiece 140 that is to be obtained by machining the workpiece 140 accordingly.

In some embodiments, the application software component 106 and/or the processor 102 may further be configured to provide sample machine code 124s. Similar to the toolpath data 120 described above, the sample machine code 124s may be provided (e.g., by a user using the GUI 114, the input device 110, the display device 112, or the like). Alternatively or additionally, the sample machine code 124s may be provided by the CAM system 118 (or other software, such as CAD, CAE, PLM or MOM software), the machine tool 144, or the control device 146. Herein, the sample machine code 124s may be provided to the processor 102 and/or to the data store 108 where the sample machine code 124s may be stored.

The machine code 124 may, by way of example, be machine-specific process information required by a machine tool 144 for machining a workpiece 140 along a corresponding toolpath 122. The machine code 124 may, for example, include commands that may be interpreted and executed by the control device 146 and/or the machine tool 144.

In some examples, the sample machine code 124s may not correspond to the toolpath data 120 so that, for example, the respective toolpaths corresponding to the sample machine code 124s and the toolpath data 120 are different from each other. Rather, the sample machine code 124s may particularly be adapted to the machine tool 144 or the control device 146, and a user may want to have machine code 124 that both corresponds to the provided toolpath data 120 and is also adapted to the machine tool 144 or the control device 146 to provide reliable machining. Such scenarios may occur if the sample machine code 124s and the machine tool 144 or the control device 146 are available, but the corresponding postprocessor 126 adapted to the machine tool 144 or the control device 146 is not available. The user may, for example, want to machine a workpiece 140 according to newly created toolpath data 120, but cannot translate this toolpath data 120 into corresponding machine code 124 since the user does not dispose of the required postprocessor 126.

In further examples, the sample machine code 124s may correspond to the toolpath data 120.

In some examples, the application software component 106 and/or the processor 102 may further be configured to provide a trial postprocessor software component 126t for determining machine code 124 using toolpath data 120.

Using available toolpath data 120, a postprocessor 126 or postprocessor software component 126 may be used to determine the corresponding machine code 124 (e.g., by translating the toolpath data 120 from the CAM system 118 to the machine code 124 that is interpretable by the machine tool 144 and the control device 146). A postprocessor 126 may be a unique "driver" specific to a machine tool 144, computer numerical control (CNC) machine, robot, or mechanism. The postprocessor 126 may work with the CAM software or off-line programming software to make sure the machine code 124, such as G-Code, output or program is correct for a specific machine control cabinet. Herein, the CAD model of the desired workpiece 140 may be analyzed to determine what tooling and toolpaths 122 will be used to machine the desired features. Doing so may require a CAM postprocessor 126 that generates the exact machine code 124 or G-code. A postprocessor 126 may be a software subroutine (e.g., sub-program) that converts graphical or non-graphical CAM software toolpath data 120 into machine code 124.

The trial postprocessor software component 126t or short trial postprocessor 126t may, in some examples, be any postprocessor 126 that is available to the user or, for example, the CAM system 118. If there are two or more postprocessors 126 available, the user or, for example, the CAM system 118 may select one of the available postprocessors 126 that may offer certain advantages, such as easy availability, short processing times, good performance, or similarity to the machine code sample 124s, etc.

In some examples, the application software component 106 and/or the processor 102 may be further configured to determine trial machine code 124t using the trial postprocessor 126t and the toolpath data 120.

The trial postprocessor 126t may then be used to post process or translate the toolpath data 120 into the trial machine code 124t.

In some examples, the application software component 106 and/or the processor 102 may be further configured to determine a sample code architecture 128s of the sample machine code 124s and a trial code architecture 128t of the trial machine code 124t.

As already mentioned above, the sample machine code 124s may be particularly adapted to the machine tool 144 or the control device 146. This particular adaptation of machine code 124 to a certain type of machine tool 144 or to a certain type of control device 146 may, in some examples, exist with respect to different brands or makers of machine tools 144 or control devices 146. Such particular adaptations may, by way of example, also affect the code architecture 128 of machine code 124 that is particularly adapted to a certain type of machine tool 144 or to a certain type of control device 146.

By way of example, the respective code architecture 128s or 128t may, for example, characterize how actions may be encoded in the respective machine code 124s or 124t, whereby these action may be carried out by the machine tool 144. Optionally, the respective code architecture 128s or 128t may characterize a representation of information on a feed rate, a circular or linear tool movement, a tool selection, a tool change, a type of the used tool, a tool's name, an operation's name, an initial motion, a return motion, or the like in the respective machine code 124s or 124t.

Further, in some examples, for the determination of the respective code architecture 128s or 128t, only typical or key features or actions (e.g., tool changes) may be considered, and less significant features or actions (e.g., simple linear, circular, or helical movements) may be omitted. This focus on typical or key steps or features of the respective machine code 124s or 124t may, in some examples, help to reduce the computational effort to determine the respective code architecture 128s or 128t. Further, the mentioned focus reduces the influence of less significant features or actions of the sample machine code 124s that may, in some examples, not include such simple linear movements. Hence, the mentioned focus may even contribute to achieve a higher quality and reliability of the determined, respective code architecture 128s or 128t. In some examples, these typical features or the corresponding code architecture 128 may be caused by the respective postprocessor 126.

For illustration purposes, four more detailed examples are provided in the context of the code architecture 128. In a first example, a first machine code 124 adapted to a first machine tool 144 or a first control device 146 may use the (x,y,z) coordinates (0,0,0) as a home position, whereas a second machine code 124 adapted to a second machine tool 144 or a second control device 146 may use the (x,y,z) coordinates (600,0,0) as a home position. Hence, in this first example, the home position may, in some examples, be a typical feature of the respective machine code 124 that may be comprised by the determined respective code architecture 128. Further, in a second example, the position in the machine code 124 at which the mentioned home position is defined may be different. For example, in a first machine code 124 adapted to a first machine tool 144 or a first control device 146, the home position may be defined at the beginning of the file including the first machine code 124, whereas in a second machine code 124 adapted to a second machine tool 144 or a second control device 146, the home position may be defined at the end of the file including the second machine code 124. Hence, in this second example, the position at which the home position is defined in the file including the machine code 124 may, in some examples, be a typical feature of the respective machine code that may be comprised by the determined respective code architecture 128. In a third example, a first machine code 124 adapted to a first machine tool 144 or a first control device 146 may use a particular work plane (e.g., x=0 in (x,y,z) coordinates) for defining the tool movements required for the machining process, whereas a second machine code 124 adapted to a second machine tool 144 or a second device 146 may use a different work plane (e.g., y=0 in (x,y,z) coordinates). Hence, in this third example, the defined work plane may, in some examples, be a typical feature of the respective machine code that may be comprised by the determined respective code architecture 128. In a fourth example, a first machine code 124 adapted to a first machine tool 144 or a first control device 146 may use a certain axis (e.g., the fourth axis) to execute a certain machining process, whereas a second machine code 124 adapted to a second machine tool 144 or a second control device 146 may use a different axis (e.g., the combined fourth and fifth axis) to execute the same machining process. Hence, in this fourth example, the selected axis for executing a certain machining process may, in some examples, be a typical feature of the respective machine code that may be comprised by the determined respective code architecture 128.

In further examples, the application software component 106 and/or the processor 102 may be further configured to determine characteristics 130 of the sample machine code 124s by comparing the sample code architecture 128s with the trial code architecture 128t.

As already mentioned above, for example, in the context of the above four more detailed examples, there may, in some examples, exist a particular adaptation of machine code 124 to a certain type of machine tool 144 or to a certain type of control device 146. In the context of the sample machine code 124s, these particular adaptations of the sample machine code 124s may, by way of example, contribute to the mentioned characteristics 130. For example, in some examples, the characteristics 130 of the sample machine code 124s may depend on the comparison of the sample machine code 124s and the corresponding sample code architecture 128s with the trial machine code 124t and the corresponding trial code architecture 128t. Hence, both the sample machine code 124s and the trial machine code 124t through the trial postprocessor 126t and the toolpath data 120 may influence the mentioned characteristics 130.

By way of example, the characteristics may relate to a difference of the way key features or key actions (e.g., tool changes) are expressed in the sample machine code 124s compared to how such key features or key actions are expressed in the trial machine code 124t. For example, by comparing the sample code architecture 128s with the trial code architecture 128t, differences in the code architecture 128 may be identified that may allow to indicate how the sample machine code 124s architecturally differs from the trial machine code 124t.

For illustration purposes, in the context of the above four more detailed examples, the characteristics 130 may relate to the following architectural features if the sample machine code 124s and the trial machine code 124t differ from each other accordingly: the home position, the position at which the home position is defined in the file including the machine code 124, the defined work plane, or the selected axis for executing a certain machining process.

In an example embodiment, the application software component 106 and/or the processor 102 may be further configured to determine a new postprocessor software component 126n by incorporating the characteristics 130 into the trial postprocessor software component 126t.

Incorporating the characteristics 130 into the trial postprocessor 126t may, in some examples, provide that the trial postprocessor 126t may be amended using the characteristics 130. This amendment may be done by replacing functionalities of the trial postprocessor 126t that generate architectural features differing from the sample code architecture 128s with comparable functionalities that, however, generate architectural features that correspond or are at least more similar to the sample code architecture 128s. The mentioned amended trial postprocessor 126t may then be used as the new postprocessor 126n.

For illustration purposes, in the context of the above four more detailed examples, the amendment of the trial postprocessor 126t may, for example, be such that the following architectural features are incorporated into the new postprocessor 126n: the home position may be changed from the (x,y,z) coordinates (0,0,0) to (600,0,0); the position at which the home position is defined in the file including the machine code 124 may be changed from the beginning of the file to the end of the file; the defined work plane may be changed from x=0 to y=0 in (x,y,z) coordinates; the selected axis for executing a certain machining process may be changed from the fourth axis to the combined fourth and fifth axis.

In some examples, the accordingly determined new postprocessor 126n may be more similar to the postprocessor 126 that has originally been used to create the sample machine code 124s. Assuming that the sample toolpath data 120s underlying the sample machine code 124s is available, the new postprocessor 126n may, in some examples, translate this sample toolpath data 120s into machine code 124 that has the a code architecture 128 that, ideally, is the same than the sample code architecture 128s or is at least more similar to the sample code architecture 128s than the trial code architecture 128t.

In further examples, the application software component 106 and/or the processor 102 may be further configured to: determine new machine code 124n using the new postprocessor software component 126n and the toolpath data 120; determine a similarity value 132 relating to the similarity between the sample machine code 124s and the new machine code 124n; and display the similarity value 132 to a user via a user interface 116.

The new postprocessor 126n may be used to post process or translate the toolpath data 120 into a new machine code 124n.

The similarity value 132 may, for example, relate to the similarity between the sample machine code 124s and the new machine code 124n by measuring the similarity between the sample machine code 124s and the new machine code 124n. The similarity value 132 may, for example, be determined using a similarity measure, a similarity function, or a similarity metric that may be understood as a real-valued function that quantifies the similarity between two objects (e.g., between the sample machine code 124s and the new machine code 124n). In some examples, such measures may in some sense be the inverse of distance metrics: such measures take on large values for similar objects and either zero or a negative value for very dissimilar objects. For example, a cosine similarity may be applied by interpreting the sample machine code 124s and the new machine code 124n as real-valued vectors for which the cosine similarity may determine a similarity value 132 by scoring the similarity of the sample machine code 124s and the new machine code 124n in the corresponding vector space model. In machine learning, common kernel functions such as the radial basis function (RBF) kernel may be viewed as similarity functions.

The determined similarity value 132 may then be displayed to the user, which may allow the user, in some examples, to estimate the quality of the new postprocessor 126n and make a decision whether to use or to discard the new postprocessor 126n.

To improve the meaningfulness of the similarity value 132, less significant features or actions comprised by the toolpath data 120, the corresponding new machine code 124n, and/or the sample machine code 124s, such as simple linear, circular, or helical movements, may be omitted for the determination of the similarity value 132. This omission may, as already explained above, in some examples, already be applied during the determination of the respective code architecture 128s or 128t.

In further examples, a new code architecture 128n of the new machine code 124n may be determined. The similarity value 132 may, in some examples, relate to the similarity between the sample machine code 124s and the new machine code 124n by measuring the similarity between new code architecture 128n and the sample code architecture 128s.

The user interface 116 may, in some examples, be comprised by the CAM system 118 or the machine tool 144.

In some examples, the application software component 106 and/or the processor 102 may further be configured to determine characteristics 130 of the sample machine code 124s by only considering differences between the sample machine code 124s and the trial machine code 124t.

Focusing on differences between the sample machine code 124s and the trial machine code 124t may, in some examples, help to reduce the computational effort to determine the characteristics 130 of the sample machine code 124s. Therefore, even for some examples for which only typical or key features or actions are considered for the determination of the respective code architecture 128s or 128t, a further reduction of the required computational efforts may be achieved. For example, the sample machine code 124s and the trial machine code 124t may both include a similar tool change and differ from each other in the way the home position is defined; then, only the aspects related to the definition of the home position may be considered for determining the characteristics 130, while the aspects related to the tool change may be ignored.

In some examples, the application software component 106 and/or the processor 102 may further be configured to include at least one iteration of the acts: determining new machine code 124n using the new postprocessor software component 126n and the toolpath data 120; determining a new code architecture 128n of the new machine code 124n; determining new characteristics 130n of the sample machine code 124s by comparing the sample code architecture 128s with the new code architecture 128n; and determining an updated postprocessor software component 126u by incorporating the new characteristics 130n into the new postprocessor software component 126n.

A more refined and accurate postprocessor 126 may, in some examples, be achieved by carrying out at least one such iteration that uses the new postprocessor 126n instead of the previously used trial postprocessor 126t. The determination of the updated postprocessor 126u may, by way of example, be desired or required, because it is suspected that the new postprocessor 126n is not yet accurate enough. The determination of the updated postprocessor 126u may, for example, be done if the above-mentioned similarity value is considered to be too small (e.g., smaller than 80%, 90%, 95% or 98%). Optionally, the corresponding similarity value 132 may be determined and displayed to a user via a user interface 116.

Using the new postprocessor 126n, the toolpath data 120 may be used to determine new machine code 124n of which the corresponding new code architecture 128n may be determined, whereby new characteristics 130n of the sample machine code 124s may then be determined. The new characteristics 130n of the sample machine code 124s may then be used to determine an updated postprocessor 126u. If desired or required (e.g., because it is suspected that the updated postprocessor 126n is not yet accurate enough), this procedure may be iterated once or a number of times, now replacing the new postprocessor 126n and the new machine code 124n with the updated postprocessor 126u and according updated machine code 124u (or making corresponding amendments for the second or subsequent iterations).

In further examples, the application software component 106 and/or the processor 102 may further be configured to: determine updated machine code 124u using the updated postprocessor software component 126u and the toolpath data 120; determine an updated similarity value 132u measuring the similarity between the sample machine code 124s and the updated machine code 124u; and stop the iteration if the updated similarity value 132u exceeds a similarity threshold.

The procedure of determining respective machine code 124 using the latest postprocessor 126 and the toolpath data 120, and of determining a respective latest similarity value 132 measuring the similarity between the sample machine code 124s at the latest determined machine code 124, may be iterated (e.g., as with the above-mentioned determination of the respective postprocessor 126) once or a number of times, now replacing the preceding machine code 124 and the preceding similarity value 132 with the latest machine code 124 and the latest similarity value 132.

The mentioned similarity threshold for stopping the iteration may, by way of example, correspond to the respective similarity value 132 of 80%, 90%, 95%, or 98%. Hence, if the updated similarity value 132u is larger than the similarity threshold, no further iteration may be required, and the determined updated postprocessor 126u may be considered to be reliable enough and close enough to the postprocessor 126 that has originally been used to create the sample machine code 124s.

In some examples, the similarity threshold may be determined by considering a potential convergence of respective similarity values determined for the respective postprocessor 126 of the sequentially performed iterations. For example, in a series of five iterations, the respective similarity values may be 75% for the first iteration, 90% for the second iteration, 94% for the third iteration, 94.8% for the fourth iteration, and 95.2% for the fifth iteration; then, the sequence of iterations may already be stopped at the fourth iteration because the improvement of the similarity value from the third to the fourth iteration is only one percentage point. In some examples, a sufficient convergence of the similarity values along the iterations may be present if the increase of the corresponding similarity values is smaller than 5%, 2%, or 1%.

Optionally, the corresponding similarity value 132 may be determined and displayed to a user via a user interface 116.

In some examples, stopping the iteration if the corresponding similarity value exceeds the similarity threshold may help to reduce the computational effort to determine a reliable postprocessor 126.

In some examples, a code dialect of the sample machine code 124s may correspond to a controller type of the control device 146 to which the code dialect is adapted. The application software component 106 and/or the processor 102 may further be configured to: provide a first trained machine learning (ML) model 134-1 for determining the controller type of the sample machine code 124; and determine the controller type to which the sample machine code 124s is adapted using the first trained ML model 134-1 and the sample machine code 124s.

By way of example, different makers of control devices 146 or of corresponding machine tools 144, such as Fanuc Corporation of Oshino-mura, Japan, Dr. Johannes Heidenhain GmbH of Traunreut, Germany, or Siemens Aktiengesellschaft of Munich, Germany, may use certain particularities, such as a particular syntax, in their respective machine code 124. It may, for example, be that different machine tools 144 of Fanuc Corporation use slightly different machine code 124 that, however, is clearly distinguishable from machine code 124 used for machine tools 144 of Dr. Johannes Heidenhain GmbH for the same machining process. These specialties in the respective machine code 124 may, for example, be understood as respective code dialects that are interpretable by the machine tool 144 or the corresponding control device 146 for which the respective code dialect has been generated. If such a code dialect is used for a different machine tool 144 or a different control device 146, however, difficulties may occur, such as error messages received by the machine tool 144 or the control device 146 prior or during the machining process, poor workpiece quality or wrongly machined workpieces, damages of the machine tool 144 or the control device 146, or the like.

A respective, specifically adapted postprocessor 126 may be able to generate the machine code 124 in the right code dialect that is correctly interpretable by the corresponding control device 146.

To facilitate the determination of the new postprocessor 126*n*, the controller type of the sample machine code 124*s* may be determined. This may be done since the sample machine code 124*s* may be written in a particular code dialect that is linked to a particular controller type of the control device 146. Hereby, the relation between the code dialect and the controller type may be provided through the first trained ML model 134-1. In some examples, a trained ML model, such as the first trained ML model 134-1 or the below mentioned second trained ML model 134-2, may be or include a machine learning algorithm, a deep learning model, an artificial neural network, or more generally an artificial intelligence-based function. The corresponding trained ML model may, in some examples, be used for pattern recognition or data mining. The trained ML model may generally receive input data that is then processed using the trained ML model to generate output data. In the context of the first trained ML model 134-1, the sample machine code 124*s* may be provided as input data that is processed using the first trained ML model 134-1 to determine the controller type of the control device 146 to which the code dialect is adapted as output data. In some examples, the first trained ML model may be stored in the data store 108.

In some examples, the first trained ML model 134-1 may be trained, for example, by providing a plurality of samples of machine code 124 along with the indication of the respective code dialect used in the respective sample of machine code 124 and/or the respective control device 146 to which the respective sample of machine code 124 is adapted. The training may enable the determination of the code dialect of the sample machine code 124*s* through the first trained ML model 134-1.

In some examples, a particularly reliable first trained ML model 134-1 may be obtained by a training with an approximately balanced distribution of samples of machine code 124 over the related different control devices 146. For example, approximately the same number of samples of machine code 124 may be provided for each of the available or known control devices 146. For example, ten samples of machine code 124 may be provided for the control device 146 of Siemens, eleven samples for the Fanuc control device 146, and nine samples for the Heidenhain control device 146. Hence, the mentioned training may involve an at least approximately balanced class distribution, where deviations of the number of provided samples of machine code 124 of up to ±10% or ±20% per type of control device 146 with respect to a balanced distribution may, in some examples, still be considered to be balanced.

In some alternative examples, a code dialect of the sample machine code 124*s* may correspond to a controller type of the control device 146 to which the code dialect is adapted, where the application software component 106 and/or the processor 102 may further be configured to: provide a dialect-controller rule set linking dialect elements of the code dialect with the corresponding respective controller type; and determine the controller type to which the sample machine code 124*s* is adapted using the dialect-controller rule set and the sample machine code 124*s*.

Instead of using the above-mentioned first trained ML model 134-1, the dialect-controller rule set that links dialect elements of the code dialect with the corresponding respective controller type may be provided. The mentioned rule set may be derived by comparing samples of machine code 124 of different controller types.

In the context of the above four more detailed examples, particularly distinctive dialect elements may relate to the home position, the position at which the home position is defined in the file including the machine code 124, the defined work plane, and the selected axis for executing a certain machining process. Such particularly distinctive dialect elements may look differently from one controller type to the other, and hence, such dialect elements may be linked to the corresponding controller type.

Using such a dialect-controller rule set, the sample machine code 124*s* may be parsed for commands or dialect elements that are typical for a given controller type. For example, if an error is returned or a mismatch is determined, the sample machine code 124*s* may be checked for the next controller type. In some examples, all controller types available in the dialect-controller rule set may be parsed, and the controller type that returns the least errors may be determined to be the controller type to which the sample machine code 124*s* is adapted. In other examples, the controller type that first returns a sufficiently small number of errors (e.g., less than five) for the complete sample machine code 124*s* may be determined to be the controller type to which the sample machine code 124*s* is adapted.

By way of example, the application software component 106 and/or the processor 102 may further be configured to use the determined controller type to provide the trial postprocessor software component 126*t* and/or to determine the respective code architecture 128, 128*t* of the respective machine code 124*s*, 124*t*.

The determined controller type (e.g., the type of the control device 146 to which the sample machine code 124*s* is adapted) may, by way of example, be used to provide the trial postprocessor 126*t*. In some examples, if a plurality of the trial postprocessors 126*t* is available, the trial postprocessor 126*t* may be chosen that corresponds best to the determined controller type. Such a targeted selection of the trial postprocessor 126*t* may help to get a particularly reliable new postprocessor 126*n* with only little computation efforts. In some examples, this targeted selection may avoid the necessity or the scope of the above-mentioned iterations (e.g., such that already the first attempt to determine the new postprocessor 126*n* results in a similarity value 132 that is above the mentioned similarity threshold).

In some examples, the determined controller type may be used to determine the respective code architecture 128 of the respective machine code 124, especially the sample code architecture 128*s* of the sample machine code 124*s*. As mentioned above, the respective code architecture 128 may characterize how actions may be encoded in the respective machine code 124, whereby these actions may be carried out by the machine tool 144, and whereby the controller type may influence the respective code architecture 128. Consequently, this use of the determined controller type may, for example, result in a particularly good determination of the respective code architecture 128 that may help to get a particularly reliable new postprocessor 126*n* with only little computation efforts.

In some examples, the application software component 106 and/or the processor 102 may be further configured to: provide a second trained ML model 134-2 for determining the respective code architecture 128*s*, 128*t*, 128*n* of the respective machine code 124*s*, 124*t*, 124*n*; and determine the respective code architecture 128*s*, 128*t*, 128*n* of the respective machine code 124*s*, 124*t*, 124*n* using the second trained ML model 134-2 and the respective machine code 124*s*, 124*t*, 124*n*.

To facilitate the determination of the new postprocessor 126*n*, the determination of the respective code architecture 128 may be refined. Hereby, the relation between the respective machine code 124 (e.g., the sample machine code 124*s*, the trial machine code 124*t*, the new machine code 124*n*, . . . , and its corresponding code architecture 128, such as the sample code architecture 128*s*, the trial code architecture 128*t*, the new code architecture 128*n*, . . . ) may be provided through the second trained ML model 134-2. In the context of the second trained ML model 134-2, for example, the sample machine code 124*s* may be provided as input data that is processed using the second trained ML model 134-2 to determine the sample code architecture 128*s*. In some examples, the respective second trained ML model may be stored in the data store 108.

In some examples, the second trained ML model 134-1 may be trained (e.g., by providing a plurality of samples of machine code 124 along with the corresponding, respective code architecture 128). The training may enable the determination of the respective code architecture 128 through the second trained ML model 134-2.

In some alternative examples, the application software component 106 and/or the processor 102 may be further configured to: provide a code-architecture rule set linking machine code elements of the respective machine code 124 with corresponding code architecture elements of the respective code architecture 128; and determine the code architecture 128 using the code-architecture rule set and the machine code 124.

Instead of using the above-mentioned respective second trained ML model 134-2, a code-architecture rule set that links machine code elements of the respective machine code 124 with corresponding code architecture elements of the respective code architecture 128 may be provided, whereby this may apply, for example, to the sample machine code 124*s*, the trial machine code 124*t*, the new machine code 124*n*, . . . , on the one hand, and the sample code architecture 128*s*, the trial code architecture 128*t*, the new code architecture 128*n*, . . . , on the other hand.

In the context of the above four more detailed examples, particularly distinctive dialect elements may relate to the home position, the position at which the home position is defined in the file including the machine code 124, the defined work plane, and the selected axis for executing a certain machining process. Such particularly distinctive dialect elements may look differently from one code architecture 128 to the other, and hence, such dialect elements may be linked to the corresponding code architecture 128.

By way of example, the application software component 106 and/or the processor 102 may further be configured to machine the workpiece 140 with the tool 142 along a given toolpath 122*g* using machine code 124 determined using the new postprocessor software component 126*n* or the updated postprocessor software component 126*u*.

In some examples, the given toolpath 122*g* may be the above-mentioned toolpath 122 to which the toolpath data 120 corresponds. In further examples, the given toolpath 122*g* may be different than the above-mentioned toolpath 122. In that case, the given toolpath 122*g* may be used, for example, by the CAM system 118 to determine corresponding given toolpath data 120*g*. This given toolpath data 120*g* (or if the given toolpath 122*g* corresponds to the above-mentioned toolpath 122, the toolpath data 120) may then be post processed using the new postprocessor 126*n* (or the updated postprocessor 126*n* or a later version of the postprocessor 126) to determine corresponding given machine code 124*g* that may be used by the machine tool 144 to machine the workpiece 140 according to the given toolpath 122*g*. The machining process may, in some examples, be controlled by the machine tool 144 or its control device 146, to which the determined given machine code 124*g* may be transmitted.

As illustrated in FIG. 1, the CAM system 118 may be communicatively connected with the machine tool 144 that includes the control device 146 and the tool 142. The CAM system 118 may, in some examples, transmit the machine code 124 to the machine tool 144 or directly to the control device 146 so that the machine tool 144 may move the tool 142 (e.g., relatively to the workpiece 140) along the toolpath 122 to machine the workpiece 140 according to the machine code 124.

According to other approaches, postprocessors translate toolpath information (e.g., toolpath data or a toolpath) from the CAM system into NC code (e.g., machine code) to run the job on the machine tool. To create those postprocessors, a deep knowledge may be needed, and very experienced developers may be needed to create the postprocessor. Often, small things are overseen, and the translated output may not run correctly on the machine tool that needs adjustments on the postprocessor and a lot of time and money to adjust. According to these other approaches, customers may already have a lot of hand-written NC programs that may be used manually to match the postprocessor to the desired output. This, however, is a time- and resource-consuming, inefficient process that is in addition error-prone.

According to some examples of the suggested approach, a machine learning software may be provided to scan NC code (e.g., machine code 124) and detect the specific settings that are to be made, and automatically set up the postprocessor to create the right output for the machine tool. This offers the advantage that non-experienced users are allowed to just take an NC file (e.g., the sample machine code 124*s*), for example, even postprocessed from a different CAM system, and create the matching postprocessor.

One of the biggest advantages of the suggested approach may include that non-experts of postprocessing (e.g., typically not having the knowledge of specific postprocessors, such as presales colleagues) may just take an NC file (e.g., the sample machine code 124*s*), run the NC file through the software (e.g., process the sample machine code 124*s* according to the suggested solution), and the postprocessor is created. This may considerably impress the customer, also because the customer may be sure that investments in additional service and fixing issues for the translation will not be required. Even for professional postprocessor developers, the suggested solution is a huge help in creating the postprocessor with lot of efficiency (e.g., since the required time to create a postprocessor may heavily be reduced).

The described application software component 106 and/or the processor 102 may carry out an analogous method of managing a postprocessor 126 (e.g., determining a new postprocessor 126*n*) for machining with a machine tool 144.

Further, a computer-readable medium 160 (e.g., a non-transitory computer-readable storage medium) that may include a computer program product 162 is shown in FIG. 1. The computer program product 162 may be encoded with executable instructions that, when executed, cause the computer system 100 or and/or the CAM system 118 (or optionally the machine tool 144) to carry out the described method.

Figure 2:
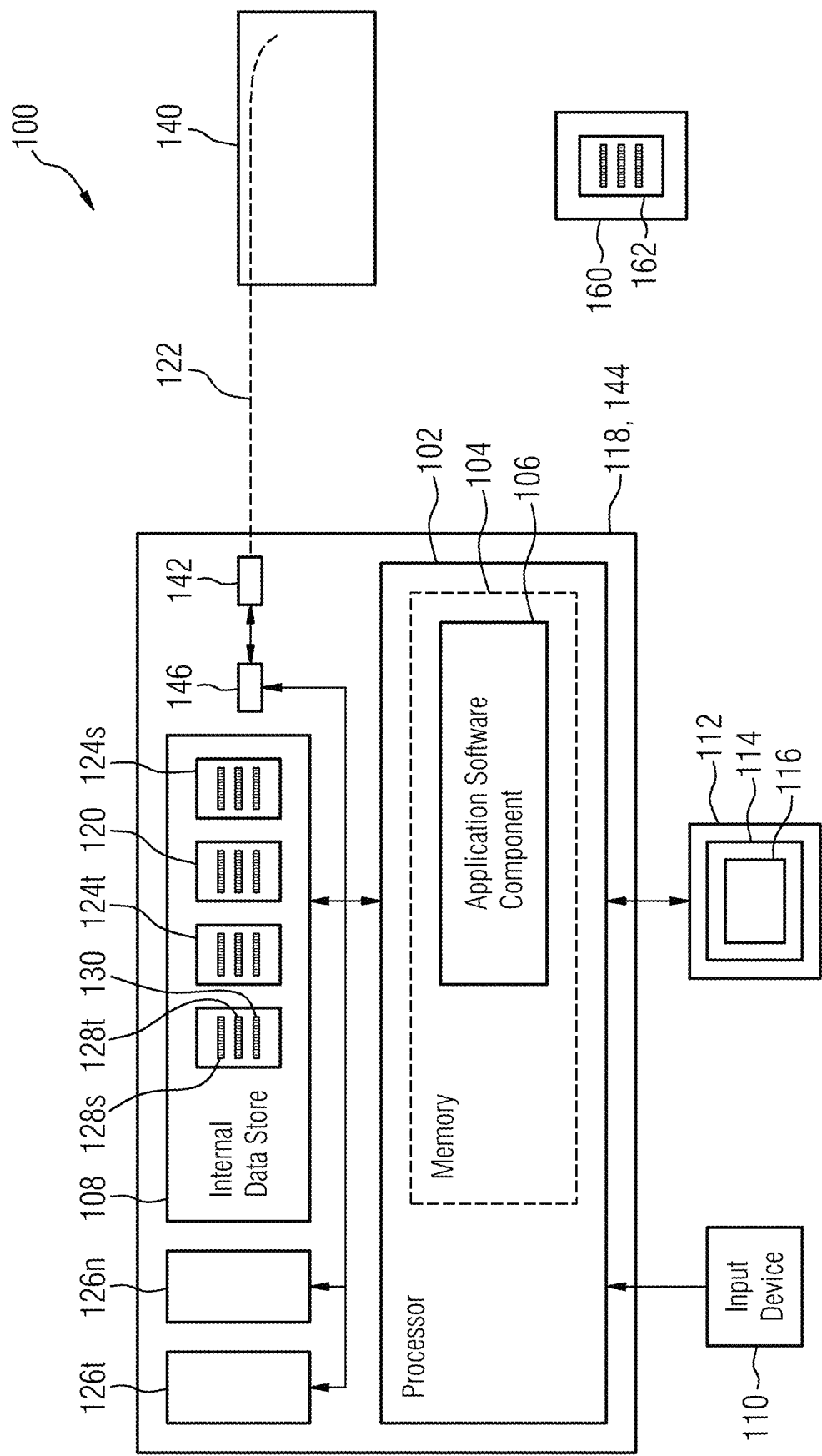

With reference to FIG. 2, a functional block diagram of another example product system or data processing system 100 that facilitates managing a postprocessor 126 (e.g., determining a new postprocessor 126n) for machining with a machine tool 144 is illustrated.

As illustrated in FIG. 2, the CAM system 118 and the machine tool 144 may be one combined apparatus that includes the control device 146 and the tool 142. This apparatus may have the above-described functionalities that facilitate managing a postprocessor 126 (e.g., determining a new postprocessor 126n). The apparatus may, by way of example, move the tool 142 along the toolpath 122 to machine the workpiece 140 according to the machine code 124.

Figure 3:
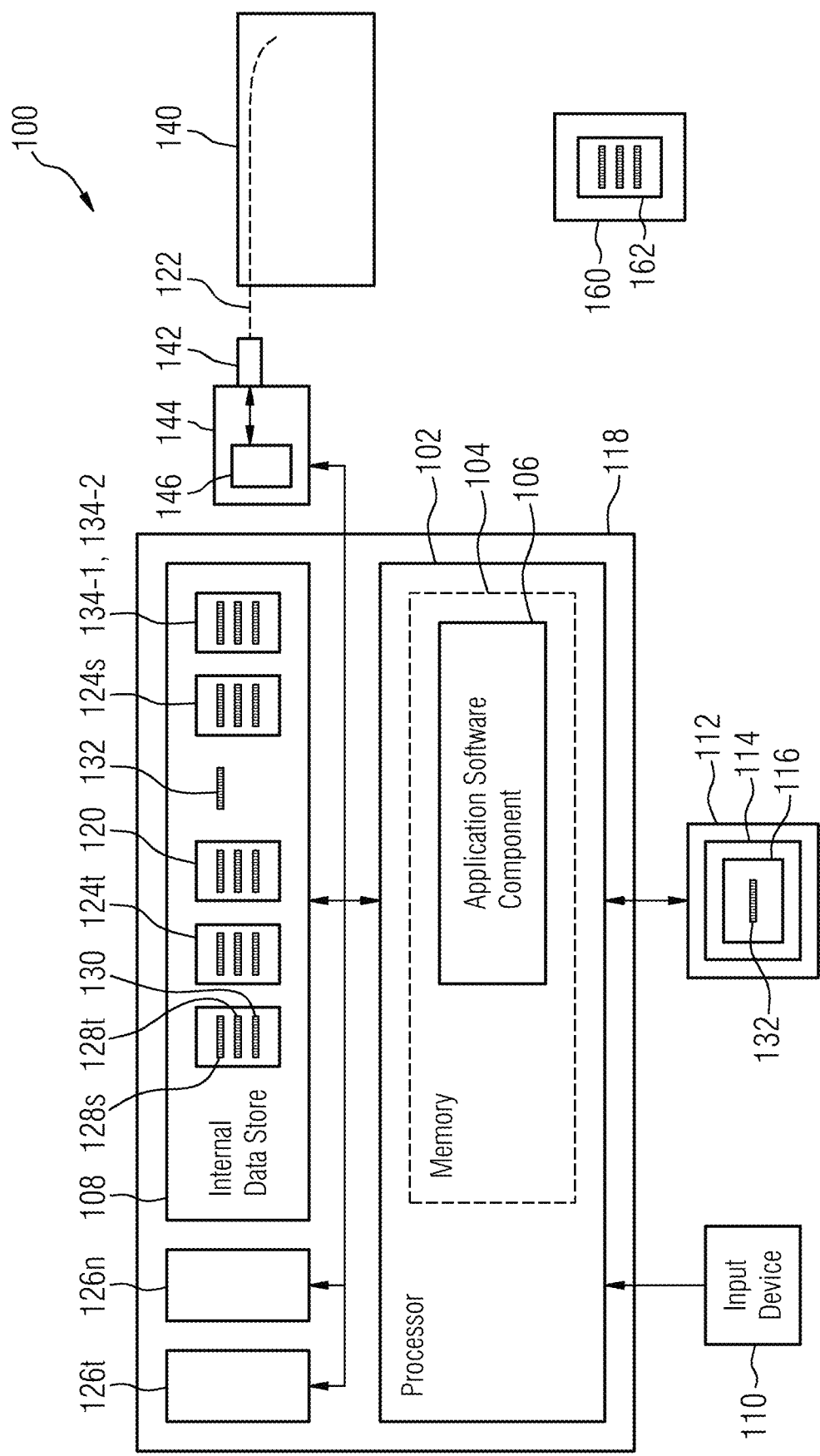

With reference to FIG. 3, a functional block diagram of a further example product system or data processing system 100 that facilitates managing a postprocessor 126 (e.g., determining a new postprocessor 126n) for machining with a machine tool 144 is illustrated.

As illustrated in FIG. 3, the CAM system 118 includes a first trained ML model 134-1 for determining the controller type of the sample machine code 124. The controller type to which the sample machine code 124s is adapted may be determined by the CAM system 118 using the first trained ML model 134-1 and the sample machine code 124s. Further, the CAM system includes a second trained ML model 134-2 for determining the sample code architecture 128s and the trial code architecture 128t of the sample machine code 124s and of the trial machine code 124t, respectively. The respective code architecture 128s, 128t of the respective machine code 124s, 124t may be determined by the CAM system 118 using the second trained ML model 134-2 and the respective machine code 124s, 124t. Both the first trained ML model 134-1 and the second trained ML model 134-2 may be stored in the data store 108.

Figure 4:
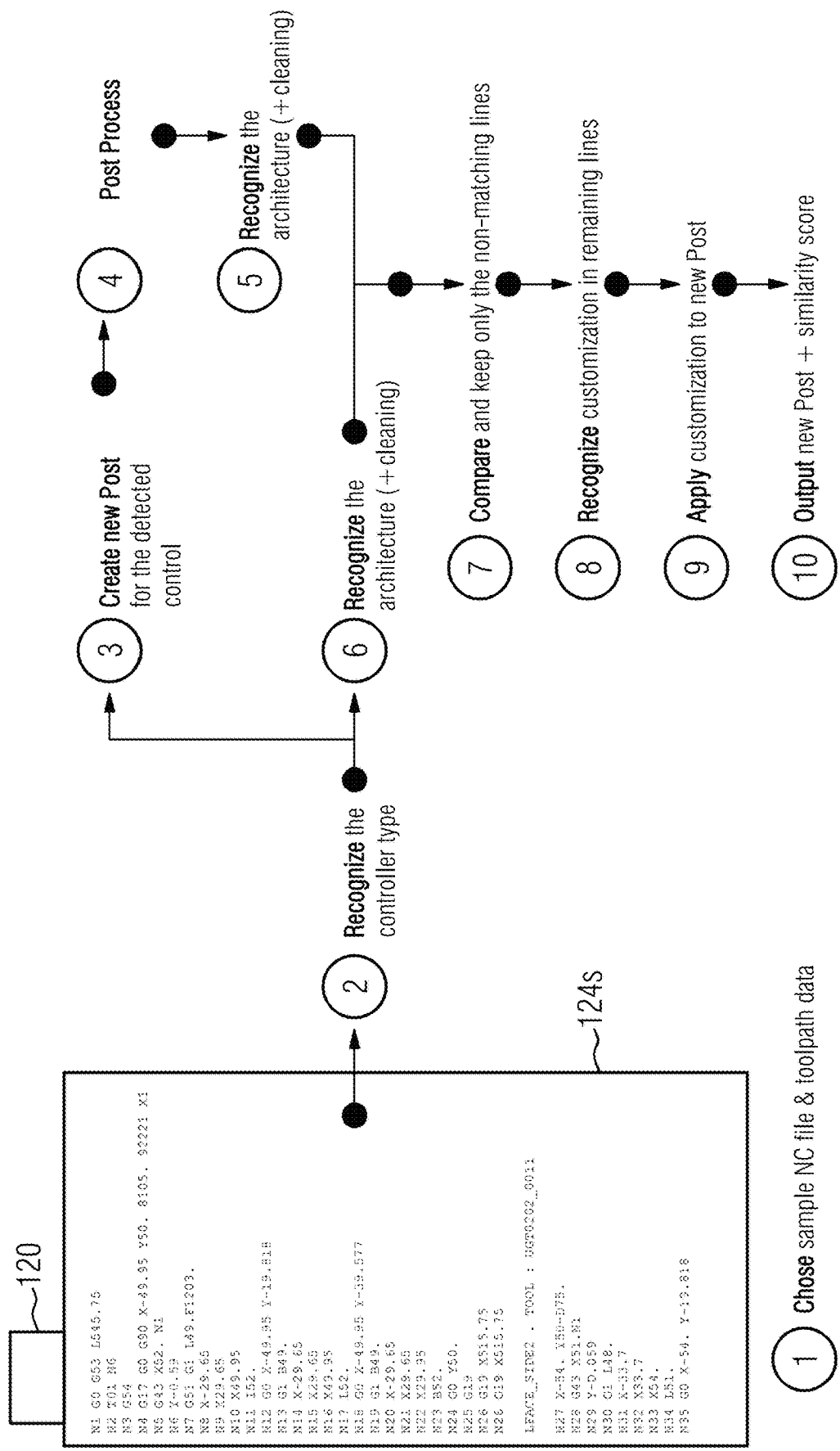
FIGS. 4 and 5 illustrate a flow diagram of an example methodology that facilitates managing a postprocessor for machining with a machine tool, in a product system.

With reference to FIG. 4, a flow diagram of an example methodology that facilitates managing a postprocessor 126 (e.g., determining a new postprocessor 126n) for machining with a machine tool 144, in a product system or data processing system 100, is illustrated.

In act 1, the user may provide a sample NC file (e.g., the sample machine code 124s) by, for example, selecting or choosing the desired NC file from a repository including a plurality of NC files. The user may further provide toolpath data 120 that may or may not be related to the sample NC file.

In act 2, the controller type of the provided sample NC file may be recognized (e.g., the controller type of the control device 146 to which the sample machine code 124s is adapted). Act 2 is an optional step.

In act 3, a trial postprocessor 126s (e.g., in FIG. 4, act 3: "new Post") that may optionally be selected as to correspond as good as possible to the recognized controller type may be provided. If the optional act 2 has not been carried out, a default trial postprocessor 126t may be provided independently from the controller type of the sample NC file. Also, if the act 2 does not provide decisive results, a default trial postprocessor 126t may be provided independently from the controller type of the sample NC file.

In act 4, the toolpath data 120 is post processed using the trial postprocessor 126t to obtain the trial machine code 124t.

In act 5, the trial architecture 128t of the trial machine code 124t may be determined, whereby optionally only typical or key features or actions of the trial machine code 124t may be considered, and the rest of the trial machine code 124t may be deleted during a cleaning step.

In act 6, which may be carried out parallelly to the above-described steps 3 to 5, the sample architecture 128s of the sample machine code 124s may be determined, whereby optionally only typical or key features or actions of the sample machine code 124s may be considered, and the rest of the sample machine code 124s may be deleted during a cleaning step.

In act 7, the trial architecture 128t and the sample architecture 128s are compared, whereby optionally only the non-matching lines or features may be kept and considered for the next act.

In act 8, the customization of the sample machine code 124s may be recognized (e.g., considering only the non-matching lines or features mentioned above). Hereby, the customization corresponds to the characteristics 130 of the sample machine code 124s.

In act 9, the customization (e.g., the characteristics 130) may be applied to the trial postprocessor 126t (e.g., in FIG. 4, act 9: "new Post") for determining the new postprocessor 126n (e.g., by incorporating the characteristics 130 into the trial postprocessor 126t to determine the new postprocessor 126n).

In act 10, the new postprocessor 126n may be output to the user (e.g., in FIG. 4, act 10: "new Post") and, for example, be used for post processing the toolpath data 120 or other toolpath data to determine corresponding machine code for machining a workpiece 140 accordingly. Optionally, a similarity value 132 may be determined and output to the user, where the similarity value 132 relates to the similarity between the sample machine code 124s and a new machine code 124n that is determined using the new postprocessor 126n and the toolpath data 120. The mentioned output may be displayed to the user (e.g., using the user interface 116).

Figure 5:
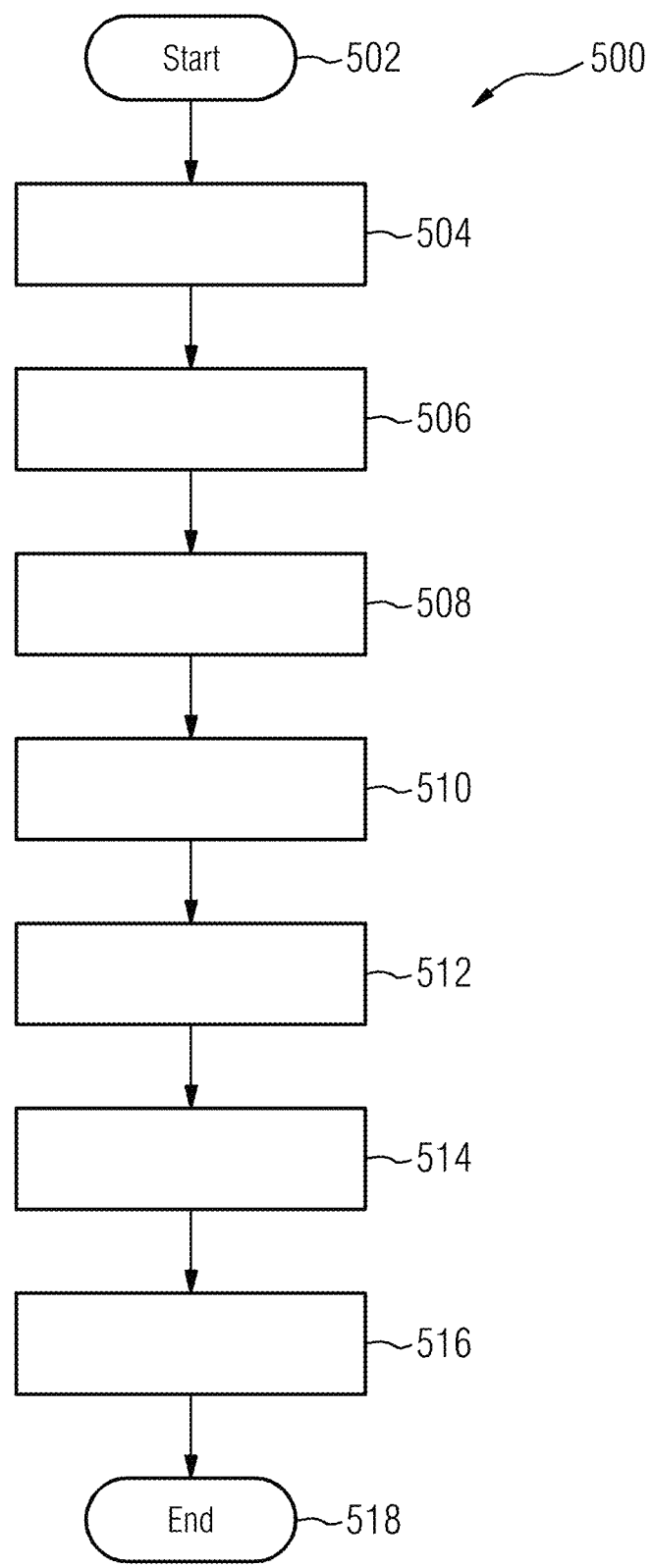

With reference to FIG. 5, a flow diagram of another example methodology 500 that facilitates managing a postprocessor (e.g., determining a new postprocessor) for machining with a machine tool, in a product system or data processing system is illustrated. The method may start at act 502, and the methodology may include a number of acts, for example, carried out through operation of the processor or the machine tool. These acts may include an act 504 providing toolpath data for machining a workpiece with a tool along a corresponding toolpath, where the tool is comprised by a machine tool that is numerically controlled by a control device. In act 506, sample machine code is provided. In act 508, a trial postprocessor software component is provided for determining machine code using toolpath data. In act 510, trial machine code is determined using the trial postprocessor software component and the toolpath data. In act 512, a sample code architecture of the sample machine code and a trial code architecture of the trial machine code are provided. In act 514, characteristics of the sample machine code are determined by comparing the sample code architecture with the trial code architecture. In act 516, a new postprocessor software component is determined by incorporating the characteristics into the trial postprocessor software component. In act 518, the methodology may end.

The methodology 500 may include other acts and features discussed previously with respect to the processing system 100 or the computer-implemented method.

For example, the above examples are equally applicable to the processor, the control device, the machine tool, or the computer system, and to the corresponding computer-readable medium and the computer program product explained in the present patent document, respectively.

Figure 6:
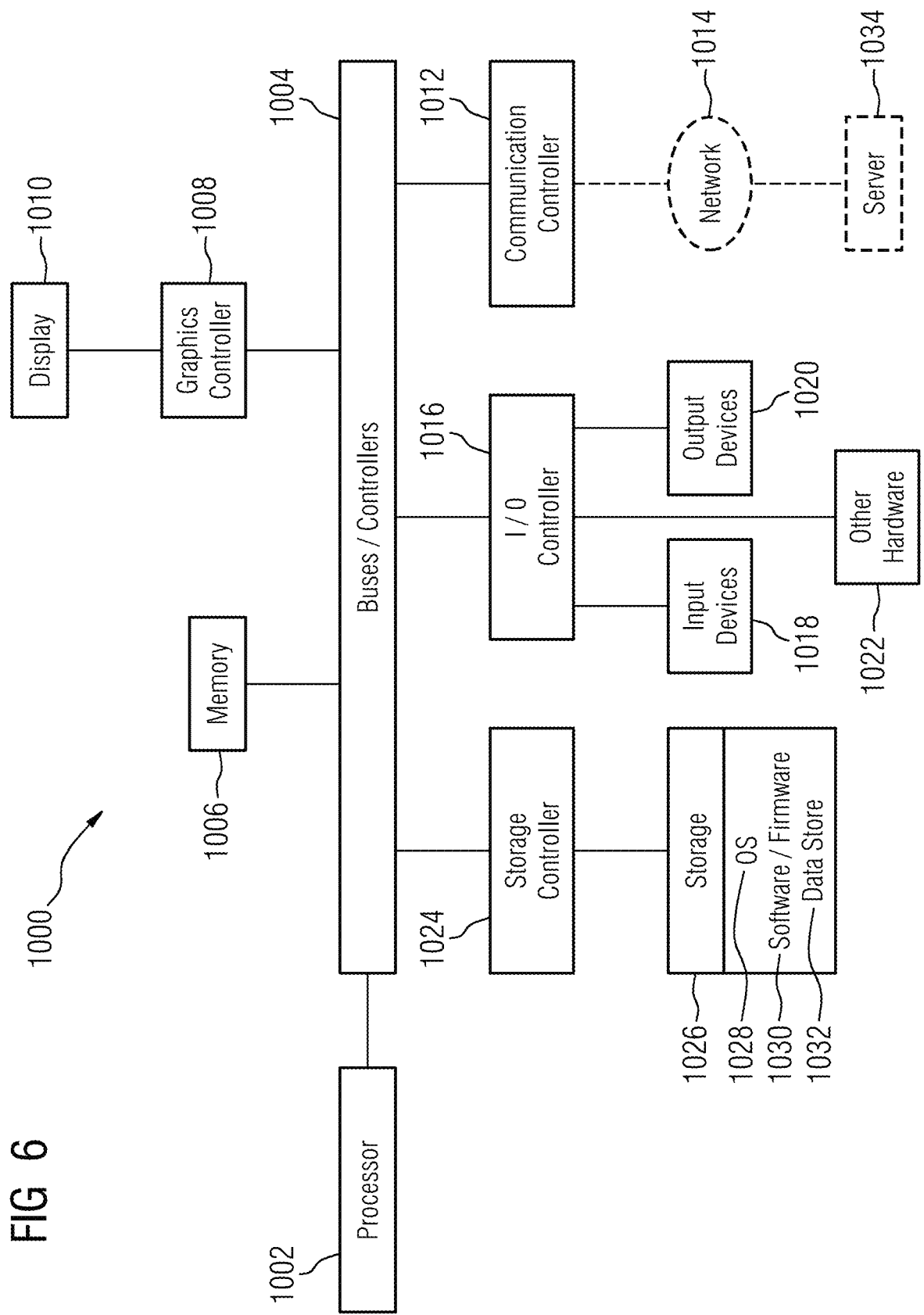
FIG. 6 illustrates a block diagram of a data processing system in which an embodiment may be implemented.

FIG. 6 illustrates a block diagram of a data processing system 1000 (also referred to as a computer system) in which an embodiment may be implemented, for example, as a portion of a product system, and/or other system operatively configured by software or otherwise to perform the processes as described herein. The data processing system 1000 may include, for example, the computer or IT system or data processing system 100 mentioned above. The data processing system depicted includes at least one processor 1002 (e.g., a CPU) that may be connected to one or more bridges/controllers/buses 1004 (e.g., a north bridge, a south bridge). One of the buses 1004, for example, may include one or more I/O buses such as a PCI Express bus. Also connected to various buses in the depicted example may include a main memory 1006 (RAM) and a graphics controller 1008. The graphics controller 1008 may be connected to one or more display devices 1010. In some embodiments, one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 1012 (e.g., Ethernet controllers, WiFi controllers, cellular controllers) operative to connect to a local area network (LAN), Wide Area Network (WAN), a cellular network, and/or other wired or wireless networks 1014 or communication equipment.

Further components connected to various busses may include one or more I/O controllers 1016 such as USB controllers, Bluetooth controllers, and/or dedicated audio controllers (e.g., connected to speakers and/or microphones). Various peripherals may be connected to the I/O controller(s) (e.g., via various ports and connections) including input devices 1018 (e.g., keyboard, mouse, pointer, touch screen, touch pad, drawing tablet, trackball, buttons, keypad, game controller, gamepad, camera, microphone, scanners, motion sensing devices that capture motion gestures), output devices 1020 (e.g., printers, speakers), or any other type of device that is operative to provide inputs to or receive outputs from the data processing system. Also, many devices referred to as input devices or output devices may both provide inputs and receive outputs of communications with the data processing system. For example, the processor 1002 may be integrated into a housing (e.g., a tablet) that includes a touch screen that serves as both an input and display device. Further, some input devices (e.g., a laptop) may include a plurality of different types of input devices (e.g., touch screen, touch pad, keyboard). Also, other peripheral hardware 1022 connected to the I/O controllers 1016 may include any type of device, machine, or component that is configured to communicate with a data processing system.

Additional components connected to various busses may include one or more storage controllers 1024 (e.g., SATA). A storage controller may be connected to a storage device 1026 such as one or more storage drives and/or any associated removable media, which may be any suitable non-transitory machine usable or machine-readable storage medium. Examples include nonvolatile devices, volatile devices, read only devices, writable devices, ROMs, EPROMs, magnetic tape storage, floppy disk drives, hard disk drives, solid-state drives (SSDs), flash memory, optical disk drives (CDs, DVDs, Blu-ray), and other known optical, electrical, or magnetic storage devices drives and/or computer media. Also, in some examples, a storage device such as an SSD may be connected directly to an I/O bus 1004 such as a PCI Express bus.

A data processing system in accordance with an embodiment of the present disclosure may include an operating system 1028, software/firmware 1030, and data stores 1032 (e.g., that may be stored on a storage device 1026 and/or the memory 1006). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed, and/or an event, such as clicking a mouse button or touching a touch screen, may be generated to actuate a desired response. Examples of operating systems that may be used in a data processing system may include Microsoft Windows, Linux, UNIX, iOS, and Android operating systems. Also, examples of data stores include data files, data tables, relational database (e.g., Oracle, Microsoft SQL Server), database servers, or any other structure and/or device that is capable of storing data that is retrievable by a processor.

The communication controllers 1012 may be connected to the network 1014 (not a part of data processing system 1000), which may be any public or private data processing system network or combination of networks, as known to those of skill in the art, including the Internet. Data processing system 1000 may communicate over the network 1014 with one or more other data processing systems such as a server 1034 (also not part of the data processing system 1000). However, an alternative data processing system may correspond to a plurality of data processing systems implemented as part of a distributed system in which processors associated with a number of data processing systems may be in communication via one or more network connections and may collectively perform tasks described as being performed by a single data processing system. Thus, it is to be understood that when referring to a data processing system, such a system may be implemented across a number of data processing systems organized in a distributed system in communication with each other via a network.

Further, the term "controller" may be any device, system, or part thereof that controls at least one operation, whether such a device is implemented in hardware, firmware, software, or some combination of at least two of the same. The functionality associated with any particular controller may be centralized or distributed, whether locally or remotely.

In addition, data processing systems may be implemented as virtual machines in a virtual machine architecture or cloud environment. For example, the processor 1002 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system may vary for particular implementations. For example, the data processing system 1000 in this example may correspond to a computer, workstation, server, PC, notebook computer, tablet, mobile phone, and/or any other type of apparatus/system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

Also, the processor described herein may be located in a server that is remote from the display and input devices described herein. In such an example, the described display device and input device may be comprised in a client device that communicates with the server (and/or a virtual machine executing on the server) through a wired or wireless network (which may include the Internet). In some embodiments, such a client device, for example, may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In such examples, the processor described herein may correspond to a virtual processor of a virtual machine executing in a physical processor of the server.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, as used herein, a processor corresponds to any electronic device that is configured via hardware circuits, software, and/or firmware to process data. For example, processors described herein may correspond to one or more (or a combination) of a microprocessor, CPU, FPGA, ASIC, or any other integrated circuit (IC) or other type of circuit that is capable of processing data in a data processing system, which may have the form of a controller board, computer, server, mobile phone, and/or any other type of electronic device.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 1000 may conform to any of the various current implementations and practices known in the art.

The words or phrases used herein should be construed broadly, unless expressly limited in some examples. For example, the terms "comprise" and "include," as well as derivatives thereof, mean inclusion without limitation. The singular forms "a," "an," and "the" are intended to include the plural forms as well, unless the context clearly indicates otherwise. Further, the term "and/or" as used herein refers to and encompasses any and all possible combinations of one or more of the associated listed items. The term "or" is inclusive, providing and/or, unless the context clearly indicates otherwise. The phrases "associated with" and "associated therewith," as well as derivatives thereof, may be to comprise, be comprised within, interconnect with, contain, be contained within, connect to or with, couple to or with, be communicable with, cooperate with, interleave, juxtapose, be proximate to, be bound to or with, have, have a property of, or the like.

Also, although the terms "first," "second," "third" and so forth may be used herein to describe various elements, functions, or acts, these elements, functions, or acts should not be limited by these terms. Rather, these numeral adjectives are used to distinguish different elements, functions, or acts from each other. For example, a first element, function, or act may be termed a second element, function, or act, and, similarly, a second element, function, or act may be termed a first element, function, or act, without departing from the scope of the present disclosure.

In addition, phrases such as "processor is configured to" carry out one or more functions or processes, may be that the processor is operatively configured to or operably configured to carry out the functions or processes via software, firmware, and/or wired circuits. For example, a processor that is configured to carry out a function/process may correspond to a processor that is executing the software/firmware, which is programmed to cause the processor to carry out the function/process and/or may correspond to a processor that has the software/firmware in a memory or storage device that is available to be executed by the processor to carry out the function/process. A processor that is "configured to" carry out one or more functions or processes may also correspond to a processor circuit particularly fabricated or "wired" to carry out the functions or processes (e.g., an ASIC or FPGA design). Further, the phrase "at least one" before an element (e.g., a processor) that is configured to carry out more than one function may correspond to one or more elements (e.g., processors) that each carry out the functions and may also correspond to two or more of the elements (e.g., processors) that respectively carry out different ones of the one or more different functions. In addition, the term "adjacent to" may be that an element is relatively near to but not in contact with a further element; or that the element is in contact with the further portion, unless the context clearly indicates otherwise.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method comprising:
providing toolpath data for machining a workpiece with a tool along a corresponding toolpath, wherein the tool is comprised by a machine tool that is numerically controlled by a control device;
providing sample machine code;
providing a trial postprocessor software component for determining machine code using toolpath data;
determining trial machine code using the trial postprocessor software component and the toolpath data;
determining a sample code architecture of the sample machine code and a trial code architecture of the trial machine code;
determining characteristics of the sample machine code, the determining of the characteristics of the sample machine code comprising comparing the sample code architecture with the trial code architecture; and determining a new postprocessor software component, the determining of the new postprocessor software component comprising incorporating the characteristics into the trial postprocessor software component.

2. The computer-implemented method of claim 1, further comprising:

determining new machine code using the new postprocessor software component and the toolpath data;

determining a similarity value relating to a similarity between the sample machine code and the new machine code; and displaying the similarity value to a user via a user interface.

3. The computer-implemented method of claim 1, further comprising:

determining characteristics of the sample machine code by only considering differences between the machine code and the trial machine code.

4. The computer-implemented method of claim 1, further comprising at least one iteration of:

determining new machine code using the new postprocessor software component and the toolpath data;

determining a new code architecture of the new machine code;

determining new characteristics of the sample machine code, the determining of the new characteristics of the sample machine code comprising comparing the sample code architecture with the new code architecture; and determining an updated postprocessor software component, the determining of the updated postprocessor software component comprising incorporating the new characteristics into the new postprocessor software component.

5. The computer-implemented method of claim 4, further comprising:

determining updated machine code using the updated postprocessor software component and the toolpath data;

determining an updated similarity value measuring the similarity between the sample machine code and the updated machine code; and stopping the iteration when the updated similarity value exceeds a similarity threshold.

6. The computer-implemented method of claim 1, wherein a code dialect of the sample machine code corresponds to a controller type of the control device to which the code dialect is adapted, and wherein the method further comprises:

providing a first trained machine learning model for determining the controller type of the sample machine code; and determining the controller type to which the sample machine code is adapted using the first trained machine learning model and the sample machine code.

7. The computer-implemented method of claim 1, wherein a code dialect of the sample machine code corresponds to a controller type of the control device to which the code dialect is adapted, and wherein the method further comprises:

providing a dialect-controller rule set linking dialect elements of the code dialect with the corresponding respective controller type; and determining the controller type to which the sample machine code is adapted using the dialect-controller rule set and the sample machine code.

8. The computer-implemented method of claim 6, wherein the determined controller type is used to:

provide the trial postprocessor software component;

determine the respective code architecture of the respective machine code; or a combination thereof.

9. The computer-implemented method of claim 6, further comprising:

providing a second trained machine learning model for determining the respective code architecture of the respective machine code; and determining the respective code architecture of the respective machine code using the second trained machine learning model and the respective machine code.

10. The computer-implemented method of claim 1, further comprising:

providing a code-architecture rule set linking machine code elements of the respective machine code with corresponding code architecture elements of the respective code architecture; and determining the code architecture using the code-architecture rule set and the machine code.

11. The computer-implemented method of claim 4, further comprising:

machining the workpiece with the tool along a given toolpath using machine code determined using the new postprocessor software component or the updated postprocessor software component.

12. A computer system for numerically controlling a machine tool that comprises a tool for machining a workpiece along a toolpath, the computer system comprising:

a processor configured to:

provide toolpath data for machining a workpiece with a tool along a corresponding toolpath, wherein the tool is comprised by a machine tool that is numerically controlled by a control device;

provide sample machine code;

provide a trial postprocessor software component for determining machine code using toolpath data;

determine trial machine code using the trial postprocessor software component and the toolpath data;

determine a sample code architecture of the sample machine code and a trial code architecture of the trial machine code;

determine characteristics of the sample machine code, the determination of the characteristics of the sample machine code comprising comparison of the sample code architecture with the trial code architecture; and determine a new postprocessor software component, the determination of the new postprocessor software component comprising incorporation of the characteristics into the trial postprocessor software component.

13. The computer system of claim 12, wherein the computer system is a computer-aided manufacturing system or a control device.

14. A machine tool comprising:

a tool for machining a workpiece along a toolpath; and a control device for numerically controlling the machine tool, the control device comprising:

a processor configured to:

provide toolpath data for machining a workpiece with the tool along a corresponding toolpath, wherein the tool is comprised by a machine tool that is numerically controlled by a control device;
provide sample machine code;
provide a trial postprocessor software component for determining machine code using toolpath data;
determine trial machine code using the trial postprocessor software component and the toolpath data;
determine a sample code architecture of the sample machine code and a trial code architecture of the trial machine code;
determine characteristics of the sample machine code, the determination of the characteristics of the sample machine code comprising comparison of the sample code architecture with the trial code architecture; and
determine a new postprocessor software component, the determination of the new postprocessor software component comprising incorporation of the characteristics into the trial postprocessor software component.

15. In a non-transitory computer-readable storage medium that stores instruction executable by one or more processors, the instructions comprising:
providing toolpath data for machining a workpiece with a tool along a corresponding toolpath, wherein the tool is comprised by a machine tool that is numerically controlled by a control device;
providing sample machine code;
providing a trial postprocessor software component for determining machine code using toolpath data;
determining trial machine code using the trial postprocessor software component and the toolpath data;
determining a sample code architecture of the sample machine code and a trial code architecture of the trial machine code;
determining characteristics of the sample machine code, the determining of the characteristics of the sample machine code comprising comparing the sample code architecture with the trial code architecture; and
determining a new postprocessor software component, the determining of the new postprocessor software component comprising incorporating the characteristics into the trial postprocessor software component.

16. The non-transitory computer-readable storage medium of claim 15, wherein the instructions further comprise:
determining new machine code using the new postprocessor software component and the toolpath data;
determining a similarity value relating to a similarity between the sample machine code and the new machine code; and
displaying the similarity value to a user via a user interface.

17. The non-transitory computer-readable storage medium of claim 15, wherein the instructions further comprise:
determining characteristics of the sample machine code by only considering differences between the machine code and the trial machine code.

18. The non-transitory computer-readable storage medium of claim 15, wherein the instructions further comprise at least one iteration of:
determining new machine code using the new postprocessor software component and the toolpath data;
determining a new code architecture of the new machine code;
determining new characteristics of the sample machine code, the determining of the new characteristics of the sample machine code comprising comparing the sample code architecture with the new code architecture; and
determining an updated postprocessor software component, the determining of the updated postprocessor software component comprising incorporating the new characteristics into the new postprocessor software component.

* * * * *